United States Patent
Bernard et al.

(10) Patent No.: US 6,470,758 B1
(45) Date of Patent: Oct. 29, 2002

(54) FLOAT-TYPE FLOWMETER

(76) Inventors: Heinz Bernard, Neudorfer Strasse 195, 47057 Duisburg (DE); Reinhard Haak, Trienendorfer Strasse 139, 48300 Wetter (DE)

( * ) Notice: Subject to any disclaimer, the term of this patent is extended or adjusted under 35 U.S.C. 154(b) by 0 days.

(21) Appl. No.: 09/707,787

(22) Filed: Nov. 7, 2000

(30) Foreign Application Priority Data

Nov. 25, 1999 (DE) ........................................ 199 56 590

(51) Int. Cl.⁷ ................................................ G01F 1/22
(52) U.S. Cl. .................................................. 73/861.51
(58) Field of Search ...................... 73/861.44, 861.47, 73/861.57, 861.56, 861.54, 861.48, 290, 308, 291, 301, 305, 307, 309; 340/239, 853.1, 870.02, 870.05, 984

(56) References Cited

U.S. PATENT DOCUMENTS

| | | | |
|---|---|---|---|
| 3,699,560 A | * 10/1972 | Meunier et al. | 340/239 R |
| 4,523,480 A | * 6/1985 | Inoue | 73/861.56 |
| 4,592,741 A | * 6/1986 | Vincent | 604/35 |
| 4,630,485 A | * 12/1986 | Wastl | 73/861.56 |
| 4,660,422 A | * 4/1987 | Eads et al. | 73/863.02 |
| 5,079,961 A | * 1/1992 | Lew | 73/861.56 |
| 5,504,789 A | * 4/1996 | Lew et al. | 377/21 |

FOREIGN PATENT DOCUMENTS

DE   19624974   1/1998

* cited by examiner

Primary Examiner—Benjamin R. Fuller
Assistant Examiner—Jewel V. Thompson

(57) ABSTRACT

A float-type flowmeter and method for measuring the flow of fluids, incorporates a measuring tube through which measuring tube the fluid can flow against the force of gravity and which is provided with a float capable of moving at least in the direction of the flow, and an acquisition unit capable of tracking the movement of the float, with a motion signal corresponding to the movement of the float being transmissible to a diagnostic unit in which diagnostic unit an oscillation signal corresponding to the oscillation amplitude of the float can be derived from the motion signal and an error or alarm signal can be generated when, for a predefined length of time, the oscillation signal falls below a minimum setpoint value. To permit a prediction of the future progression of the condition of the float-type flowmeter, the flowmeter provides the capability to feed the motion signal corresponding to the movement of the float to a predictive evaluation unit, to compare the motion signal in the predictive evaluation unit with the values anticipated for the movement of the float as a function of the lift of the float, and, on the basis of deviations of the motion signal from the anticipated values, to cause the predictive evaluation unit to generate and output data on the current state of the float-type flowmeter as well as on the probable, expected future condition of the float-type flowmeter.

20 Claims, 1 Drawing Sheet

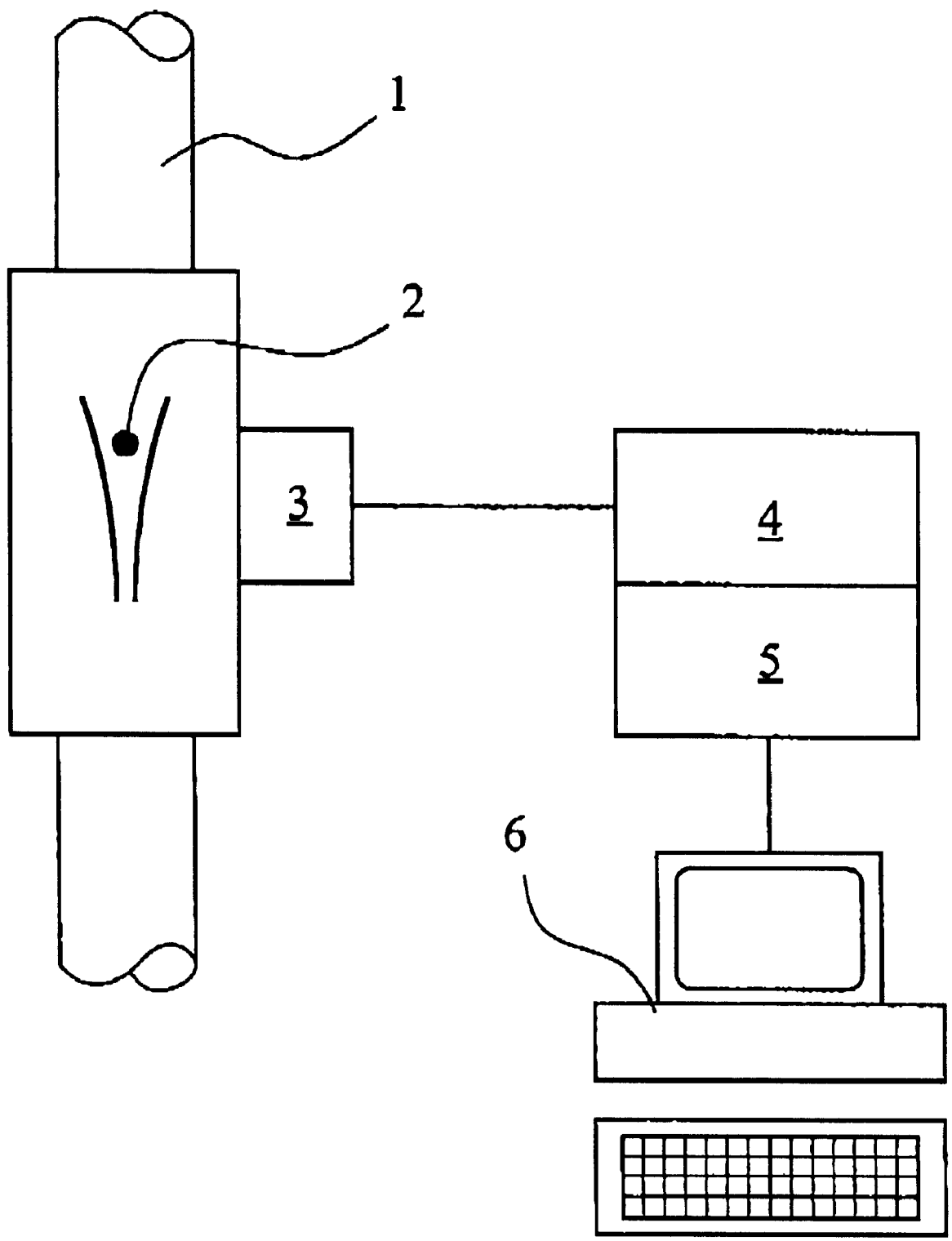

FLOAT-TYPE FLOWMETER

This invention relates to a float-type flowmeter for measuring the flow of fluids, incorporating a measuring tube through which measuring tube the fluid can flow against the force of gravity and which encompasses a float that is movable at least in the flow direction.

This invention further relates to a method for the predictive status indication of a float-type flowmeter for moving fluids which float-type flowmeter incorporates a measuring tube through which the fluid can flow against the force of gravity and which encompasses a float that is movable at least in the flow direction.

Float-type flowmeters have been used since the middle of the last century for measuring the flow volume in enclosed pipelines. To this day, they are still employed in many flow-measuring systems in the chemical and process industries.

In its simplest form, a float-type flowmeter consists of a conical measuring tube and a floating element. The fluid whose flow rate is to be determined flows through the measuring tube against the force of gravity, i.e. in an upward direction. The measuring tube is a conical tube whose flared upper end accommodates a suitably configured float which is freely movable at least in the direction of the flow and which in conjunction with the measuring tube constitutes a metering valve. The density of the float is greater than that of the fluid traveling through the measuring tube. As a function of the flow rate, the float will be suspended in the measuring tube at a particular height level which is determined by the equilibrium between the hydrodynamic force of the moving fluid impinging on the float and the difference in the weight or buoyancy parameters of the float. That height level of the float, also referred to as the float lift, can be either viewed and read directly off a graduated scale on a transparent measuring tube or transmitted for instance via a magnetic coupling for display on an external gauge and/or an electrical meter.

Even in its suspended state in which a constant flow rate keeps the float balanced at a certain lift level, the float does not stand perfectly still but oscillates at least one cycle in the direction of the flow and in the opposite direction. In addition, it is also typical for the float to oscillate in a direction perpendicular to that of the flow as well as along a rotational pattern. This phenomenon is utilized in a float-type flowmeter described in the German patent DE 196 24 974 C1 in that the amplitude, i.e. the maximum deflection of the float, is measured and analyzed and an error or alarm signal is generated when the amplitude of the float falls below a minimum setpoint value. The error or alarm signal indicates a malfunction of the float-type flowmeter, i.e. a jamming of the float in the measuring tube. This earlier design of a float-type flowmeter thus permits the instantaneous detection of a mechanical blockage of the float, avoiding a situation where the lift of a jammed float is erroneously interpreted as representing the actual flow rate.

The prior-art float-type flowmeter described above thus utilizes the oscillatory motion of the float for the detection of a blocked float in a non-transparent measuring tube where visual observation of the float in the measuring tube is not possible. One drawback of this prior-art design of a float-type flowmeter lies in the fact that an error or alarm signal is not triggered until the malfunction of the float-type flowmeter actually occurs. By then, quite possibly, too low or too high a flow rate of the fluid may already have led to damage in the pipeline or in the system connected to it.

In view of the above, it is the objective of this invention to introduce a float-type flowmeter, as well as a method for predictive status indication for a float-type flowmeter, permitting the indication of progressive deterioration and possibly impending malfunction of the float-type flowmeter.

According to the invention, the float-type flowmeter solving the problem referred to above is characterized in that it is provided with a detection system which permits the tracking of the float movement, the generation of a motion signal corresponding to the movement of the float, the transmission of this float-movement motion signal to a predictive state-evaluation unit, the comparison in the predictive state-evaluation unit of the motion signal with anticipated values for the float movement, and, based on any deviation of the motion signal from the said anticipated values, the generation and output by the predictive state evaluation unit of information relative to the probable condition of the float-type flowmeter that is to be expected as time progresses.

The predictive method according to this invention for determining the condition of a float-type flowmeter, solving the problem referred to above, is characterized in that the movement of the float is captured in the form of a motion signal which corresponds to the movement of the float and which is compared to anticipated float-movement values, and that, on the basis of any deviations of the motion signal from the anticipated values, information is generated and output relative to the probable condition of the float-type flowmeter that is to be expected as time progresses.

For the purpose of both the float-type flowmeter according to this invention and the predictive status indication method for a float-type flowmeter, the motion signal reflecting the movement of the float is utilized in its entirety. This motion signal is a time-related signal which indicates both the deflection of the float from its home position as a function of time and any possible rotational movement of the float. Thus, according to this invention and in contrast to prior art, not only the amplitude i.e. the maximum deflection of the float but the time signal describing the entire movement of the float is continually acquired and processed. It follows that, as provided for by the invention, the motion signal representing the movement of the float can be compared in continuous and multifaceted fashion with the the values anticipated for this signal, as explained in the following example.

But first it should be emphasized once again that the capabilities of the float-type flowmeter according to this invention and the predictive status indication method of this invention for a float-type flowmeter are not limited to the detection and indication of an already occurring malfunction such as a blockage of the float. Rather, the invention makes it possible to predict a condition of the float-type flowmeter that is to be expected at a future point in time. Accordingly, the user of a float-type flowmeter according to this invention is alerted relative to a malfunction to be expected when there is still time to avert such malfunction altogether by taking appropriate measures. The invention thus helps not only to detect a system failure but to prevent it in the first place.

There are a great many specific possibilities for evaluating and comparing the motion signal, representing the movement of the float, relative to the anticipated float-movement values. In this context, particular preference is given to comparing the motion signal representing the float movement with the anticipated float-movement values as a function of the lift of the float. Such a comparison based on the lift of the float means that the measured, actual motion signal is compared with a motion signal that is to be expected for the specific, true lift of the float. As explained further above, the lift is the height position of the float in the measuring tube which is determined by the equilibrium between the hydrodynamic force applied to the float by the flow and the difference of the weight or buoyancy factor of the float.

Another possible, preferred comparison can be made by comparing the oscillatory frequency of the measured, true motion signal with the oscillatory frequency of the anticipated motion signal. Of course, any such comparison must take into account the fact that equivalent oscillatory frequencies depend on the shape, size and weight of the float and, as stated above, on the lift of the float. However, it is also possible, apart from the oscillatory frequency, to analyze the pattern of the motion signal. For example, a deviation of the time-related motion signal from an anticipated sinusoidal oscillation may be an indication of an impending float blockage.

In other words, when employing a float-type flowmeter according to this invention and the predictive method of this invention, the system does not wait for a malfunction to actually occur before sending an error signal. Instead, it continuously monitors the behavior of the float, thus permitting early recognition of changes in that behavior of the float, such as a progressively smaller oscillatory amplitude in a given direction of oscillation. Correspondingly, the user of a float-type flowmeter according to this invention can be alerted early enough to an impending malfunction of the system.

In a preferred enhancement of the float-type flowmeter according to this invention and of the predictive status indication method of this invention for a float-type flowmeter, the motion signal is stored at least for a predetermined length of time and temporal changes in the motion signal cause the generation and output of data indicating the expected status and probable future condition of the float-type flowmeter. The motion signal is preferably stored in the predictive state-evaluation unit.

In a further, preferred enhancement of the invention, the motion signal can be subjected to a historical analysis which, inter alia, yields data for the mean value, the variance and the standard deviation of the motion signal. These historical measurement values can then be compared with the values anticipated for the statistical measurement data, permitting projections for progressive deterioration and, correspondingly, future malfunctions of the float-type flowmeter.

In addition, as part of a further, preferred enhancement of the invention, the motion signal can be subjected, either in its stored form or in real time, to a Fourier analysis. Accordingly, it is possible for a comparison with the values anticipated for the motion signal to establish all the values that can be obtained by a corresponding fast Fourier transform operation.

Finally, a preferred enhancement of this invention provides for the examination of an anticipated asymmetric motion pattern of the float in the conical i.e. upward-flared measuring tube. A deviation from this asymmetric motion pattern can be an indication to the effect that the measuring tube is worn, meaning that the fluid flow-rate readings of the float-type flowmeter do not reflect the actual flow rate.

It should be pointed out that, in general, with a higher flow rate and a correspondingly greater lift of the float, the float is expected to oscillate with a larger amplitude. This expectation for the normal function of the float-type flowmeter is based on a pattern of operational monotony from which any aberration can be detected by a comparison between the current oscillation amplitudes and historical as well as stored oscillation amplitudes. This means that if a deviation from this condition of operational monotony is detected, the float-type flowmeter is malfunctioning, to which fact the user is alerted.

The motion signal may contain information only on the movement of the float in terms of one of its kinetic components. Preferably, however, the motion signal is used to provide information on the movement of the float in the flow direction of the fluid and/or information on the movement of the float in a direction perpendicular to the flow direction of the fluid and/or information on the rotational movement of the float. In this connection, a preferred enhancement of the invention offers a capability whereby the comparison of the motion signal with the anticipated values provides separate comparative data on the movement of the float in the flow direction of the fluid and/or on the movement of the float perpendicular to the flow direction of the fluid and/or on the rotational movement of the float.

Of course, the float-type flowmeter of this invention and the predictive status indication method of this invention for a float-type flowmeter allow not only the generation and output of data on the probable and expected future condition of the float-type flow-meter but also on the current condition of the float-type flowmeter. In other words, apart from a prognosis, a diagnosis can be performed, whereby a corresponding signal is used to indicate a current malfunction of the float-type flowmeter.

According to the invention, the information on the current state of the float-type flowmeter and/or on the probable and expected future state of the float-type flowmeter is preferably displayed in scalar, vectorial or graphic form. Particular preference is given to feeding the information on the current state of the float-type flowmeter and/or on the probable and expected future state of the float-type flowmeter into a computer for further processing, so that the information can be displayed on a monitor screen and appropriate audio signals can be generated by the computer.

There are a great many possible ways to configure and further enhance the float-type flowmeter according to this invention and the predictive status indication method of this invention for a float-type flowmeter. In this context, reference is made both to the dependent and to the following, detailed description of a preferred embodiment in conjunction with the attached drawing which is a schematic illustration of a float-type flow-meter according to a preferred embodiment of this invention.

The float-type flowmeter according to this invention in its the preferred design shown in the figure features a measuring tube 1 through which flows, against the direction of gravity i.e. in an upward direction, a fluid whose flow rate is to be measured. A float 2 is provided whose lift and movements can be determined by an acquisition unit 3. In the preferred embodiment of the invention, the acquisition unit 3 incorporates a magnet, not illustrated, which interacts with a magnet mounted on the float, thus tracking the is latter's lift and other movements. The mechanical motion signal thus generated is converted in the acquisition unit 3 into an electrical motion signal and fed to a diagnostic unit 4. The diagnostic unit 4 is integrated into a predictive evaluation unit 5 and the predictive evaluation unit 5 as well receives the motion signal emanating from the acquisition unit 3. Of course, the diagnostic unit 4 and the predictive evaluation unit 5 do not have to be physically separated devices. Especially if a microprocessor is used for the diagnostic unit 4 and the predictive evaluation unit 5, these units can be consolidated into a single device, i.e. a single microprocessor.

The diagnostic unit 4 serves the purpose of determining whether the float-type flowmeter is currently operating properly, showing the true flow rate. To that end, an oscillation signal corresponding to the oscillation amplitude of the float 2 is derived from the motion signal in the diagnostic unit 4 and is continuously monitored. If for a predefined length of time the oscillation signal drops below an empirically established minimum setpoint value, the diagnostic unit 4 generates an error or alarm signal indicating a blockage of the float 2. This means that the float-type flowmeter is no longer functioning properly and is providing flow-rate readings which do not necessarily reflect the true flow rate corresponding to the lift level at which the float 2 is stuck. This error or alarm signal is given off by a computer 6 which is connected to the diagnostic unit 4 and the predictive evaluation unit 5. The user of a float-type flowmeter designed according to this preferred embodiment of the invention will be alerted to the blockage of the float 2 by both a visual and an acoustic signal and can take appropriate measures.

A float-type flowmeter according to this preferred embodiment of the invention also makes it possible for the user at any time to observe the current state as well as the expected future condition of the float-type flowmeter. To that end, the motion signal is also transmitted to the predictive evaluation unit 5 which, in the preferred embodiment of this invention, breaks the motion signal down into its components according to the movement of the float along the flow direction of the fluid and, respectively, perpendicular to the flow direction of the fluid. Such breakdown of the motion signal into mutually different components corresponding to the individually different movements of the float is not an absolute prerequisite of the underlying principle of this invention. However, the greater information content of the signal that is available for a comparison with the reference values permits a better and more accurate prognosis of the expected future condition of the float-type flowmeter. In the process, the different motion components are compared with the values for the individual components that were established as a function of the lift of the float 2 prior to the actual operation of the float-type flowmeter with the fluid whose flow rate is to be measured. The corresponding values are retrievably stored in a memory unit, not shown in the figure, of the predictive evaluation unit 5. This allows at any time a comparison of the current state of the float-type flowmeter with its state under normal conditions, meaning its state when first delivered or installed. Based on empirical values obtained, for instance in extended long-term tests with the float-type flowmeter, information can thus be generated both on the current state of the float-type flowmeter and on the probable, expected future state of the float-type flowmeter.

The predictive evaluation unit 5 of the float-type flowmeter according to the preferred embodiment of the invention also stores in its memory, not shown in the figure, the transients of the individual motion components, so that for prognoses performed at a later date, it is possible to call up historical data which facilitate the prediction of trends for the progressive state of the float-type flowmeter.

Corresponding to the error or alarm signal generated upon the detection of a blockage of the float 2, computer 6 also provides a graphic display and acoustic message indicating the current and, respectively, the expected future state of the float-type flow-meter. By means of the computer 6, it is also possible for the user of the float-type flow-meter meter to further evaluate or process the information obtained, employing software programs of his own. While not reflected in the figure, this may even include the computer processing of additional system parameters such as the float-type flowmeter temperature, captured and fed to the computer 6 by an appropriate sensor.

What is claimed is:

1. A float-type flowmeter for measuring the flow of a fluid comprising
    a measuring tube through which a fluid can flow against the force of gravity;
    a float in said tube, said float being movable in the tube at least in the direction of the fluid flow and having a density greater than that of the fluid so that as a function of the fluid flow rate, the float will be suspended in the tube at a particular height level determined by the equilibrium between the hydrodynamic force of the fluid impinging on the float and the weight or buoyancy of the float;
    an acquisition unit positioned adjacent to the measuring tube for tracking the movement of the float in said tube and producing a corresponding motion signal, and
    a predictive evaluation unit connected to receive said motion signal, said predictive evaluation unit including means for storing an anticipated motion signal corresponding to the anticipated movement of the float and means for comparing the motion signal with the anticipated motion signal and, on the basis of deviations of the motion signal from the anticipated motion signal, providing data on the probable, expected future state of the float-type flowmeter in order to alert an user of the float-type flowmeter to an impending malfunction of the float-type flowmeter.

2. The float-type flowmeter as in claim 1, wherein said predictive evaluation unit performs said comparison on the basis of the height level of the float.

3. The float-type flowmeter as in claim 1 or 2, wherein said predictive evaluation unit compares the oscillation frequency of the motion signal with the oscillation frequency of the anticipated motion signal.

4. The float-type flowmeter as in claim 1 or 2, wherein said predictive evaluation unit compares the motion signal with the anticipated motion signal in terms of the pattern of the motion signal.

5. The float-type flowmeter as in claim 1 or 2, wherein said predictive evaluation unit stores the motion signal at least for a predefined length of time and, on the basis of time-related changes of the motion signal, provides data relative to the probable, expected future state of the float-type flowmeter.

6. The float-type flowmeter as in claim 1 or 2, wherein the predictive evaluation unit includes means responsive to the motion signal for providing information relative to the movement of the float along the flow direction of the fluid and/or to the movement of the float perpendicular to the flow direction of the fluid and/or to the rotational movement of the float.

7. The float-type flowmeter as in claim 6, wherein said predictive evaluation unit includes means which as part of the comparison of the motion signal with the anticipated motion signal, make individually separate comparisons relative to the movement of the float along the flow direction of the fluid and/or to the movement of the float perpendicular to the flow direction of the fluid and/or to the rotational movement of the float.

8. The float-type flowmeter as in claim 1 or 2, wherein said predictive evaluation unit performs a historical analysis for the motion signal.

9. The float-type flowmeter as in claim 1 or 2, wherein said predictive evaluation performs a Fourier analysis on the motion signal.

10. A method for predicting the state of a float-type flowmeter measuring the flow of a fluid, comprising the steps of providing a measuring tube through which fluid can flow against the force of gravity;

providing a float in the tube that is movable in the tube at least in the direction of the fluid flow;

tracking the movement of the float in the tube and producing a motion signal in response thereto;

obtaining and storing an anticipated motion signal corresponding to the anticipated movement of the float;

comparing the motion signal to said anticipated motion signal to produce deviations between the two;

from said deviations providing information on the probable, expected future state of the float-type flowmeter, and depending on the probable, expected future state of the float-type flowmeter alerting an user of the float-type flowmeter to an impending malfunction of the float-type flowmeter.

11. A method as in claim 10, wherein the comparison of the motion signal corresponding to the movement of the float with the anticipated motion signal is made as a function of the height level of the float.

12. The method as in claim 10 or 11 including the step of comparing the oscillation frequency of the motion signal with the oscillation frequency of the anticipated motion signal.

13. The method as in claim 10 or 11 including the step of comparing the pattern of the motion signal with the pattern of the anticipated motion signal.

14. The method as in claim 10 or 11 including the steps of storing the motion signal for at least a predefined length of time and, from time-related changes of the motion signal, providing information on the probable, expected future state of the float-type flowmeter.

15. The method as in claim 10 or 11 including the step of providing with the aid of the motion signal, information relative to the movement of the float along the flow direction of the fluid and/or to the movement of the float perpendicular to the flow direction of the fluid and/or to the rotational movement of the float.

16. The method as in claim 15, including the step of making as part of the comparison of the motion signal with the anticipated motion signal, individually separate comparisons relative to the movement of the float along the flow direction of the fluid and/or to the movement of the float perpendicular to the flow direction of the fluid and/or to the rotational movement of the float.

17. The method as in claim 10 or 11 including the step of displaying the information on the probable, expected future state of the float-type flowmeter in scalar, vectorial or graphic form.

18. The method as in claim 10 or 11 including the step of subjecting the motion signal to a historical or statistical evaluation.

19. The method as in claim 10 or 11 including the step of subjecting the motion signal to a fast Fourier transform operation.

20. A method for predicting the state of a float-type flowmeter measuring the flow of a fluid, comprising the steps of providing a measuring tube through which fluid can flow against the force of gravity;

providing a float in the tube that is movable in the tube at least in the direction of the fluid flow;

tracking the movement of the float in the tube and producing a motion signal in response thereto;

obtaining and storing an anticipated motion signal corresponding to the anticipated movement of the float;

comparing the oscillation frequency of the motion signal to the oscillation frequency of said anticipated motion signal to produce deviations between the two, and from said deviations providing information on the probable, expected future state of the float-type flowmeter.

\* \* \* \* \*